United States Patent [19]

Fruck

[11] 4,400,019
[45] Aug. 23, 1983

[54] MULTILAYER PIPE JOINT
[75] Inventor: Benant E. Fruck, The Woodlands, Tex.
[73] Assignee: Unisert Systems, Inc., Houston, Tex.
[21] Appl. No.: 256,492
[22] Filed: Apr. 22, 1981
[51] Int. Cl.³ .................. F16L 59/16; F16L 25/00; F16L 47/02; F16L 21/02
[52] U.S. Cl. .................. 285/55; 285/331; 285/286; 285/369; 285/383; 264/35
[58] Field of Search .................. 285/53, 55, 138, 286, 285/331, 369, 370, 371, 383, 417; 264/35, 36

[56] References Cited
U.S. PATENT DOCUMENTS 3,189,371 6/1965 Gwan .................. 285/55
3,266,821 8/1966 Safford .................. 285/55 X
3,662,045 5/1972 Tierling .................. 264/35
3,686,747 8/1972 Bagnulo .................. 285/371

*Primary Examiner*—Richard J. Scanlan, Jr.
*Attorney, Agent, or Firm*—Carwell & Helmreich

[57] ABSTRACT

The invention is directed to a multilayer pipe joint and, more particularly, to a pipe joint for effectively joining sections of pipe having an outer metal casing, an inner plastic pipe, and an annular cement grout sleeve. The joint comprises a dual material ring which is at least partially fitted within a recessed annular space at the end of each multilayer pipe section. The metal casing may be welded to the outer steel component of the ring, and the inner plastic pipe is sealed against the plastic component of the pipe.

26 Claims, 4 Drawing Figures

MULTILAYER PIPE JOINT

BACKGROUND OF THE INVENTION

The present invention is directed to methods and apparatus for joining multilayer joints of pipe. Dual layer and multilayer pipe joints are typically used in specialty pipeline systems, where pipeline repair or replacement is costly and corrosive elements or abrasive pipeline fluids substantially decrease the useful life of typical metal pipes. For instance, dual and multilayer pipelines are typically installed in subsea operations and in pipelines intended for transportation of corrosive or abrasive materials.

Although various barrier systems and reverse current techniques have been used to extend the life of the metal pipelines, pipelines having an inner material in contact with the fluid have been most widely accepted in the industry. Moreover, pipelines formed from only plastic materials have not been widely accepted in large pipeline systems because of poor stress characteristics. On the other hand, piping systems constructed of both metal and plastic layers have been widely accepted within the process piping industry.

A dual layer pipe typically comprises an outer casing which provides bending, tensile and radial strength to the pipe, and an inner plastic or rubber liner which serves as a smooth noncorrosive flow surface. Trilayer pipe typically utilizes a similar outer steel casing and an inner plastic pipe, but an annulus is provided between these layers which is typically filled with a cement grout or other inert material. Pipe with more than three distinct structural layers is also possible, although less common. For the purposes of the present invention, multilayer pipe is defined as pipe with three or more distinct structural layers.

A multilayer pipeline has the same benefit as a dual layer pipeline, but offers additional protection to withstand higher degrees of pressure, shock, impact and cyclic loading. Also, dual layer pipe may be suited for process piping applications, but is not suitable for many pipeline installations (e.g., subterranean applications). Multilayer pipe, on the other hand, is well suited for both process piping applications and pipeline applications. The cement grout provides a convenient means of joining together the outer steel casing and the inner plastic pipe. Further, the cement grout layer enables the multilayer pipeline to better withstand corrosion deterioration of the metal casing, serves as an added barrier between the metal layer and plastic layer to inhibit corrosion of the steel pipe if the plastic pipe were to leak (thereby extending the effective life of a pipeline handling corrosive fluids), serves as an insulator to reduce temperature variations in the transported fluids, and provides a means for regulating the pipeline buoyancy by varying the density of the cement grout mixture.

Corrosion resistant pipe may be formed by painting or coating the interior of a metal pipe. Dual layer pipe, on the other hand, is generally defined as pipe having two layers of distinct structural strength, and may be formed by extruding steel over plastic pipe, by contracting plastic pipe and subsequently expanding the plastic pipe to the interior of a metal pipe, or by wrapping steel bands over plastic pipe. Although dual layer pipe has been used commercially for years, it does not offer the substantial benefits of a multilayer pipe, and is seldom used in the pipeline field. Moreover, industrial acceptance of dual layer pipelines has been limited, in part, because the methods and apparatus for joining dual layer pipe sections have been time consuming and have often not resulted in leakproof seals between the plastic and metal layers of a pipe, especially at higher pressures.

Various types of joints for joining sections of pipe are depicted and described by Robert H. Perry and Cecil H. Chilton in *Chemical Engineers' Handbook*, Title Edition, commencing at page 6–57. Non-metallic pipe and lined pipe systems, and joints typically used in these systems, are subsequently described at page 6–79. Pipeline joints are also depicted in U.S. Pat. Nos. 3,827,733; 3,986,731; 4,011,652; 4,053,247; and 4,060,263. Yet, none of these joints have proven to be satisfactory in many situations, either because of pressure or expense.

Threaded pipeline joints are not generally accepted because they do not provide a continuous integral wall, and are therefore prohibited in many underground pipeline applications. Threaded joints also provide stress and corrosion concentration points, and do not lend themselves well to dual or multilayer pipe joints. Other joints do not adequately seal the plastic liner and allow corrosive fluid to come in contact with the metal outer casing. Dow Chemical Corporation and Peabody Corporation supply a dual layer plastic lined pipe, but the sections are flanged with molded raised face ends, or with ends suitable for gasketed pipe joints. These pipe sections are thus expensive and time consuming to install. Moreover, special precautions must be taken to insure that no welding operations are done on the pipe or flange components, since excessive heat can cause liner decomposition and failure.

For barrier corrosion control, as in coated pipe, a bell and sleeve joint supplied by AMF Tuboscope is also commercially available for joining pipe sections. This technique, however, requires that each end of pipe section be flared outwardly or belled to allow insertion of a joining sleeve, which substantially increases the cost of the pipe sections. A thin sleeve with an epoxy coating is provided for joining the sections of the pipe, but care must be taken so that the weld does not contact the sleeve when the pipe sections are joined or the epoxy coating may be severely damaged.

The above-described joints do not efficiently and reliably function to join sections of dual layer pipe, and these above-described joints therefore limit the acceptance of dual layer pipeline systems. Moveover none of the above-described joints may be satisfactorily employed to join sections of a steel-cement-plastic layer pipe, as described above. Although multilayer pipe is widely recognized as obtaining the same benefits as dual layer pipe plus significant additional features, the absence of an efficient and reliable multilayer pipe joint limits the industrial use and acceptance of standardized joints of multilayer pipe.

U.S. Pat. No. 3,662,045 describes a method for providing a multilayer pipeline which had proven satisfactory in many applications. The technique described in this patent, however, is particularly suitable for repairing a conventional metallic pipeline by inserting a smaller diameter plastic pipe within the line and subsequently filling the annulus with a cement grout. More particularly, the annulus of the multilayer pipeline described in this patent is filled with cement once the metallic line and inner plastic pipe are in place. This technique does not utilize a prefabricated joint for joining multilayer pipe sections, but rather forms a multilayer pipe in the field and uses flanged or welded joints spaced thousands of feet apart to join sections of pipe, wherein the joint is also formed at the installation site by filling the annulus portion with the cement grout. Thus, the technique described in this patent is not adaptable for forming convenient lengths of multilayer pipe at a plant location and transporting multilayer pipe sections to required installation sites.

The present invention overcomes these problems by providing a multilayer pipe joint which can be easily, effectively and reliably utilized to join prefabricated sections of multilayer pipe at the installation site. This enables convenient length (e.g. 40 foot) of multilayer pipe to be completely formed at a manufacturing plant with a cement grout in place, and the pipe sections may then be joined at the installation site without the need for time consuming cement pumping procedures.

The disadvantages of the prior art are thus overcome with the present invention, and novel methods and apparatus are hereinafter described for efficiently and reliably joining together sections of a multilayer pipeline.

SUMMARY OF THE INVENTION

In an exemplary embodiment of the present invention, convenient lengths of multilayer pipe may be formed in a manufacturing plant, comprising an outer steel pipe or casing, an inner plastic pipe, and an annular cement grout. Both the steel layer and plastic layer extend beyond the annular grout a short distance forming an annular void at the ends of each pipe section. The multilayer pipe joint is formed in the general shape of a ring fabricated according to the diameter of the multilayer pipe. The ring consists of an outer steel band component and an inner plastic band component.

In the field, the sections of multilayer pipe may be permanently joined with the pipe joint according to the following procedure. After epoxy has been applied to the surfaces of the extending plastic pipe, the ring-shaped joint is slipped into the annular space and held intact after the two pipe sections are brought together. The plastic component of the ring-shaped joint may contain a slightly tapered groove adapted for mating with the extending portion of the end section of the plastic pipe. The sliding engagement of these components forms an epoxy bond which seals the plastic component of the ring-shaped joint with the plastic pipe. Thereafter, the end sections of the steel pipe may be welded together, and the joining operation is complete.

The steel component of the ring-shaped joint acts as a heat sink so that neither the plastic component nor the plastic pipe is damaged by exposure to excessive temperature as the outer steel layers of pipe sections are welded together. Nevertheless, the steel component of the ring-shaped joint allows sufficient heat to be transmitted to the plastic epoxy bond when the pipe is joined during cold weather installations to cure the epoxy bond. Another significant function of the metallic (e.g., steel) component is its ability to withstand the maximum design pipeline fluid pressures independent of the steel casing. Since the outer layers of the pipe are welded together, the multilayer pipe benefits from the high axial strength of individual joints of steel pipe. Also, the steel band component of the joint assists to line up the sections to be joined, and provides a back-up plate for a lap joint welding operation of the steel pipe sections.

The inner plastic band component of the joint provides a continual plastic bond joint of the plastic pipe sections, so that neither the outer steel pipe nor the metallic band component of the ring-shaped joint is exposed to the corrosive fluid within the pipe. The plastic band components of the joint may be molded or machined from PVC, nylon or other suitable plastic materials. If desired, a stainless steel band may be substituted for the plastic band component, which will similarly withstand the corrosive elements within the pipeline.

The configuration of a plastic band component of the joint will be able to seal pipeline fluids under a high pressure within the multilayer pipe. The sealing surfaces are aligned with the axis of the pipe, so that fluid pressure further compresses the plastic band component against the plastic pipe. This differs from free-standing plastic piping joints in that the epoxy bond of the present invention need not withstand the shear stress component arising from axial forces. Also, the pipeline fluid would have to flow through a 180° turn to bypass the plastic band and the epoxy band or O-ring seal.

A novel multilayer pipe joint is herein provided which efficiently and reliably seals the sections of pipe so that corrosive fluid does not bypass the plastic pipe layer. Thus, the joint of the present invention enables pipe sections to be joined so that the pipe fully benefits from the combined advantages of both a metallic pipe and a plastic pipe. The multilayer pipe sections may therefore be manufactured at a plant, shipped to the installation site, and efficiently joined together with a multilayer pipe joint.

The multilayer pipeline assembly is suitable for many applications in which plastic pipe would fail because of pressure and mechanical constraints. Because of the efficiency of installation of the mutlilayer pipe joint, its high reliability with respect to sealing the fluids within the plastic layer, and the cost effectiveness of the multilayer pipe joint and the sections of pipe, the multilayer pipe employing the novel joint herein described will be competitive with the dual layer piping systems, especially in the pipeline market. Moreover, multilayer pipeline with a novel joint will benefit from all of the additional benefits and advantages of a multilayer pipeline compared to a dual layer pipeline.

Accordingly, it is the feature of the present invention to provide a novel joint for joining multilayer sections of pipe.

It is another feature of the present invention to provide methods and techniques for efficiently joining prefabricated sections of multilayer pipe at the installation site.

Still another feature of the present invention is to provide a multilayer pipeline ring consisting of an outer steel band and an inner plastic band as a component of the multilayer pipeline joint.

It is another feature of the present invention to provide a multilayer pipeline joint which realiably seals the pipeline fluids within a plastic layer of a pipe under high pipeline pressures.

Finally, it is a feature of the present invention to provide a multilayer pipeline joint adapted to be at least partially fitted in the annulus between the outer pipeline layer and inner pipeline layer.

These and other features and advantages of the invention will become apparent in the following detailed description, wherein reference is made to the figures in the accompanying drawings.

DRAWINGS

DETAILED DESCRIPTION

Figure 1:
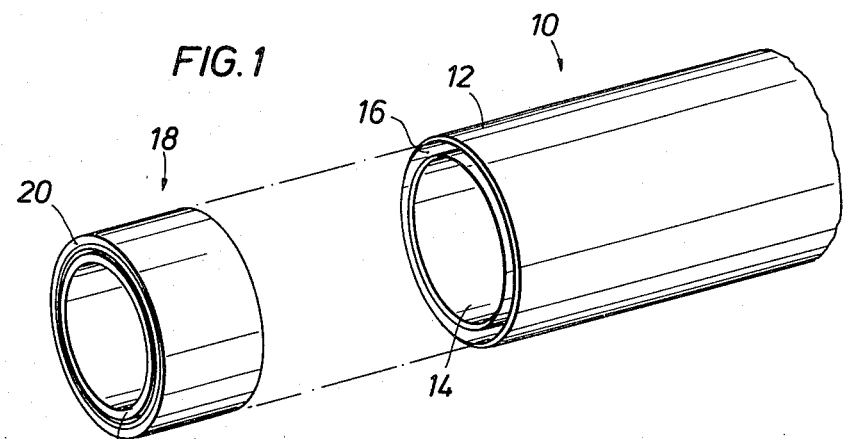
FIG. 1 is a simplified pictorial representation or length of a section of multilayer pipe and one embodiment of the multilayer pipe joint according to the present invention.

A simplified pictorial representation of a section or length of multilayer pipe 10 is shown in FIG. 1, having an outer steel casing 12 in an inner plastic pipe 14. The outer diameter plastic pipe 14 may be approximately ¼" to 1" less than the inner diameter of the steel pipe 10, so that the annulus 16 is formed between these components. With the exception of the last several inches at each end of the pipe section 10, the annulus may be filled with a generally inert non-metallic material such as a cement grout mixture.

A novel multilayer pipe joint 18 is in the general shape of a ring having a diameter generally corresponding to the diameter of the multilayer pipe. The joint 18 consists of a metal outer steel band 20 and an inner plastic band 22. As will be subsequently explained, one end of the ring or joint 18 including the metal band 20 and at least a portion of a plastic band 22 is adapted to be fitted within the annulus 16 of the section of pipe 10. The other end of the joint 18 is similarly designed for fitting engagement with a similar end of another section of pipe.

Figure 2:
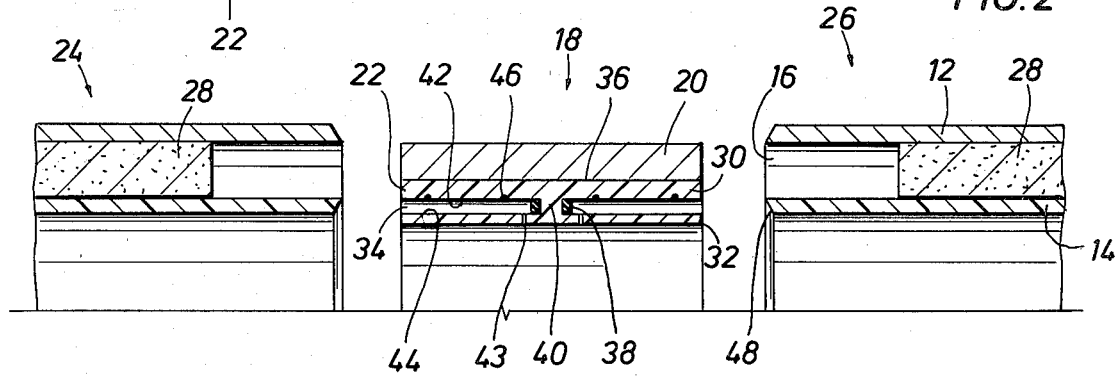
FIG. 2 is a cross-sectional representation of a portion of multilayer pipe joint illustrated in FIG. 1 and a cross-sectional representation of a multilayer pipeline wall aligned for engagement with the joint.

The apparatus of the present invention may be more easily understood by referring to FIG. 2, which depicts a cross-sectional view of the periphery of an end of a first section of multilayer pipe 24, a cross sectional view of the periphery of one embodiment of a novel joint 18, and the periphery of an end of a second section of multilayer pipe 26. Referring to both FIGS. 1 and 2, it should be understood that the ring-shaped joint depicted in cross section in FIG. 2 and the ends of both the first and second sections of pipe are axially aligned for the joining operation. In FIG. 2, it may be seen that except for the extreme end portions of the multilayer sections, a cement grout mixture 28 fills the annulus between the metal casing 12 and the inner plastic pipe 14.

Referring more particularly to the ring-shaped joint 18 depicted in FIG. 2, the outer band 20 is preferably metallic and may be fabricated from carbon steel. The plastic band 22 is joined to the inner surface of the steel band, and is shown in cross section to have a horizontally elongated "I" configuration. The band 22 may be machined or molded from any number of plastics, including PVC, nylon, polyethylene, or fiberglass. Alternatively, the band 22 may be changed to a noncorrosive metal ring such as stainless steel.

The outer surface 36 of band 22 may be coated with an adhesive to bind to the metallic ring 20. Alternatively, the plastic band 22 may be press fitted or interface fitted within the metal band by heat expansion of the metal band, proper alignment of a plastic band 22 within the metal band, and subsequent cooling contraction of the metal band 20.

The outer lips 30 of band 22 and the inner lips 32 are separated by a slot 34 having the approximate thickness of a plastic pipe 14. An epoxy bond 38, hydraulic O-ring 46, or other sealing means may be provided adjacent the plastic portion 40 separating the inner and outer lips. Also, small slots (not depicted) may be cut at convenient locations along the surfaces 42 and 44 adjacent slot 34, and O-rings 46 may be fitted in these slots.

Figure 3:
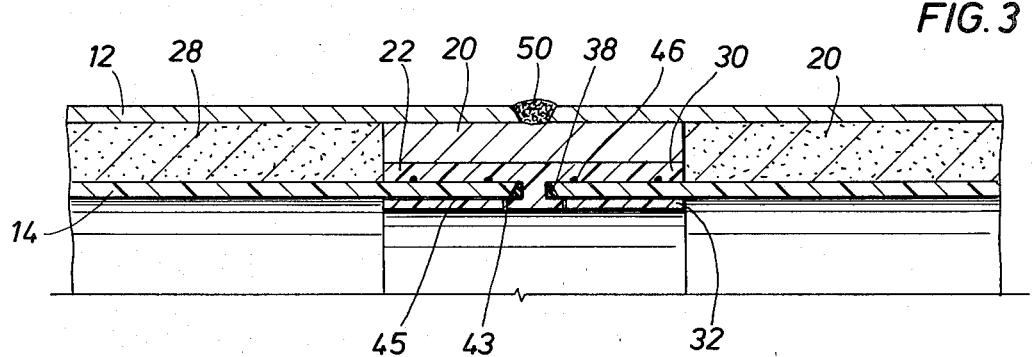
FIG. 3 is a cross-sectional representation of a portion of the pipeline joint illustrated in FIGS. 1 and 2 and a cross-sectional representation of joined walls of multilayer pipe.

The procedure for joining sections of multilayer pipe with a novel joint may be understood by referring to FIGS. 2 and 3. The joint 18 with an outer metallic ring and inner plastic ring may be slip-fitted onto the end of the multilayer pipe section. The metal band 20 and the outer lip 30 of plastic band 22 are adapted to slide within the annulus 16 at the end of the pipe. The plastic pipe 14 fills slot 34, and the inner lip 32 slidingly engages the inner surface of the plastic pipe. In the same manner, the other section of multilayer pipe may be aligned with the joint and slip-fitted over the joint. Thus, the multilayer joint is generally enclosed by the end sections of the multilayer pipe, as shown in FIG. 3. FIG. 3 also depicts a thin layer of epoxy film 45 or other sealing material on the surface 44. Epoxy film 45 bonds the lower lip 32 to the plastic pipe 14.

The length of the joint 18 may be controlled so that the end surfaces of the metallic band 20 and the end surface of the outer lip 30 engage the recessed cement grout 28. Thus, the joint is fitted or compressed between the grout layers 28 of the two pipe sections. Also, the width of a plastic portion 40 centrally located on the ring and the length of a plastic pipe 14 extending beyond the grout layer 28 may be controlled so that the ends 48 of a plastic pipe engage the epoxy bead 38 or hydraulic O-ring fitted within the slot when the pipe sections are secured in place and the ends of the joint are in engagement with the grout layers.

Hydraulic O-rings 46 may be provided along the surfaces 42 and 44 for sealingly engaging the plastic band 22 against the plastic pipe 14. Alternatively, one or more of the surfaces 42 and 44 may be thinly coated with an epoxy or other adhesive so that these surfaces bond to the mating surface of the plastic pipe.

Once the end sections of the pipe have been fitted over the joint 18, the assembly may be permanently joined by welding together the end portions of the metallic pipe 12 by weld 50. It may be seen that the metal band 20 isolates the welding operation from the plastic band 22, so that the plastic band is not damaged during the welding operation. In fact, the mass of the metallic bond 22 acts as a heat sink to protect the plastic band, while allowing a small amount of heat to be transmitted to the plastic band to cure the epoxy or adhesive in cold weather installations. For instance, the mass of the metallic band may be controlled so that the temperature at the metallic band/plastic band interface will remain below the softening and heat distortion point of the plastic during the welding operation. In general, the temperature at this interface may be controlled to 300° F. or less by regulating the width and length of the steel band.

The above-described assembly process may be efficiently performed since the only time consuming operation is the welding process, and the technique is not dependent on extreme care or elaborate joint and pipe field operation techniques. The slip-fitting of the joint over the end of the pipe is not difficult, since the steel band 20 acts as a guide to properly align the joint within the pipe and keeps the joint in place until the welding operation is complete.

The steel layers 12 of the multilayer pipe sections are joined together so that the assembled pipe-line benefits from the axial, bending, loading and shock characteristics of the individual joints of pipe. Although the outer diameter of the metal band 20 may be designed to interfit within the I.D. of the outer casing 12, this interface may be difficult to achieve because the tolerances of the I.D. of the casing are not strictly controlled. Accordingly, there may be a slight gap (e.g., $\frac{1}{8}''$) between the I.D. of the casing and the O.D. of the steel component, but this gap is not detrimental according to the present invention. The steel band component alone is able to withstand the radial and tangential stress components of a pressurized pipe without distorting or bowing against the I.D. of the casing, so that it is not necessary for the steel band to interface with the outer casing. Nevertheless, the outer casing sections may be welded or otherwise connected, thus positioning the ring properly for the intended sealing function. Moreover, even if there may be a $\frac{1}{8}''$ gap between the outer casing and the steel component of the ring, the weld may physically connect the casing to the steel ring, and thereby transmit sufficient heat to the plastic component of the ring to cure the epoxy.

The plastic band 22 provides a continual corrosion resistant link between the plastic layers of the pipe sections, and sealingly joins the plastic pipe sections so that the corrosive pipeline fluid does not contact the metal pipe 12.

The cross-sectional "I" configuration of a plastic band component 22 of a joint enables the joint to sealingly maintain pipeline fluids under high pressure within the multilayer pipe. The first surface 42 and second surface 44 engage the surfaces of the plastic pipe 14, and fluid pipeline pressure will act to further compress the inner and outer lips 30 and 32 against the plastic pipe. Each of the surfaces 42 and 44 may be generally smooth and aligned with the plastic pipe to increase the sealing engagement between each of these surfaces 42 and 44 and its respective surface on the plastic pipe. Also, the epoxy bead, epoxy seal on the surfaces 42 and 44, and/or the hydraulic O-ring seals 46 act to further seal the fluid within the pipeline, and these seals are not rendered operatively less efficient when the pipeline fluid pressure is high. Even if one or more of these seals were to leak, pipeline fluid would have to flow through a 180° turn to bypass the plastic band. If corrosive fluid were to inadvertantly pass by the plastic band, the fluid would still not come in contact with either the metal pipe 12 or the metal band 20 because of the cement grout layer 28. Also, as earlier noted, the metal band 20 is sufficiently thick to act as a heat sink, and would not quickly corrode or erode.

According to the present invention, convenient lengths of multilayer pipe (e.g., 40' or 50' lengths) may be completely formed at a manufacturing plant with the cement grout in place, and the metal and plastic pipes extending beyond the cement grout forming an annulus at the end of the pipe. Similarly, properly sized joints 18 may be prefabricated at a plant, with the hydraulic O-ring seals properly fitted in place on the joint.

For the assembly operation, an epoxy may be easily and quickly applied at the installation site, if an epoxy seal is desired. Once the ring 18 is properly placed on the ends of pipe sections, only the welding of the pipe section need be accomplished to provide the strength for the multilayer pipeline having a fluid-tight joint.

Multilayer pipe may be fabricated at a plant in a full range of conventional sizes ranging from 2" to 36" for the plastic (which will be the I.D. of the multilayer pipe). The outer metal pipe preferably is chosen from a popular size pipe, so that the thickness of the cement grout layer 28 will preferably be between $\frac{1}{4}''$ and 1". Preferred thickness of the cement grout layer will depend not only on the available sizes for the inner and outer pipes, but also on the preferred weight of the multilayer pipe and on the degree of pipeline insulation and corrosion resistance desired. In any event, however, the cement grout may efficiently act to properly center the plastic pipe within the metal pipe, and secures these pipes together to obtain the previously described advantages of a multilayer pipe.

The length of the joint 18 and the length of the annulus 16 may be correspondingly regulated so that the assembled joint is snugly fitted between the grout layers, as previously described. Typically, the length of a joint may vary from 3" to 8" depending, in part, on the diameter of the multilayer pipe. The thickness of the outer lip 30 of a plastic band 22 may typically be approximately 0.100", so that the thickness of the metallic band 20 will approximate the thickness of the cement grout layer 28 less this 0.100" dimension. Also, the length of the joint 18 may depend, in part, on the required thickness of the metal band 20, so that the metal acts as a desired heat sink during the welding operation. For instance, if the metal band 20 were $\frac{1}{4}''$ thick, the length of the metal band may be 6" or more, so that the band has a sufficient mass to protect the plastic component 22 during the welding operation.

The width of the slot 34 will approximate the thickness of the plastic pipe 14, since the surfaces 42 and 44 are designed to sealingly engage a plastic pipe and seal the corrosive fluid within the pipe. The width of the plastic portion 40 may be $\frac{1}{8}''$ to $\frac{1}{4}''$, so that if the outer metal casing terminates with the plastic pipe 14, approximately $\frac{1}{8}''$ to $\frac{1}{4}''$ spacing will be provided between adjoining sections of the metal pipe to accomodate the weld 50. The thickness of the inner lip 32 may be approximately 0.100", and the inner lips 32 may be sufficiently pliable to easily bow to a slight degree against the adjacent plastic pipe under pipeline pressure. If desired, the slot 34 may be slightly tapered to be narrower toward the center of the joint to facilitate machining and to ensure sealing engagement of the surfaces 42 and 44 with the plastic pipe 14.

When the plastic band component 22 is fitted over the extending end of the plastic pipe 14, it may be understood that air may become trapped in the slot 34. This is particularly possible if an epoxy coating is provided on the surfaces 42 and 44 for sealingly engaging these surfaces with the plastic pipe. Accordingly, a plurality of minute airholes 43 may be provided from the interior of the slot 34 through the outer lip 32 and to the interior of the multilayer pipe to allow air to escape to the interior of the pipe as the joint is fitted over the end of the pipe section.

Figure 4:
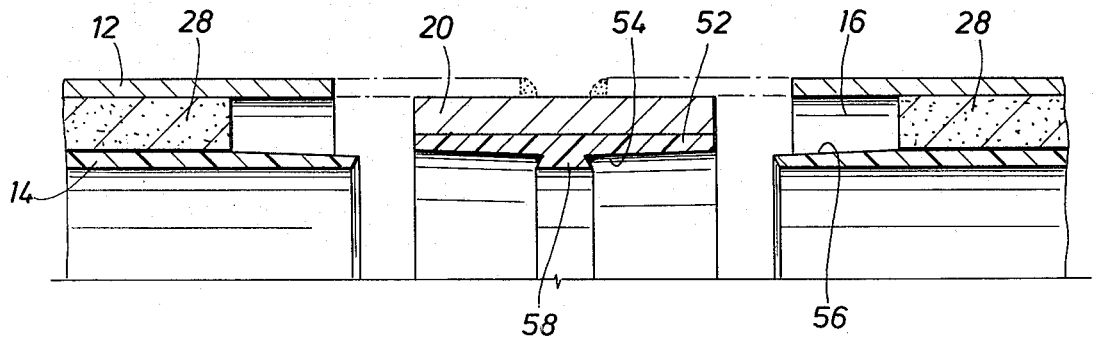
FIG. 4 is a cross-sectional representation of a portion of another embodiment of the multilayer pipeline joint and a cross-sectional representation of multilayer pipeline walls aligned for engagement with the joint.

Another embodiment of the present invention is shown in FIG. 4, wherein components similar to those previously discussed will be assigned the same numerals. A major distinction between the embodiment of the joint previously described and the embodiment depicted in FIG. 4 relates to the design of the plastic component of the pipe joint. The metal band 20 of the joint is similar to that previously described, but the plastic band 52 is shown to have a tapered surface 54 for engagement with a tapered surface 56 on the outer diameter of a plastic pipe. Surface 54 is tapered so that the plastic band 52 is thicker toward the center of the joint, and surface 56 is tapered so that the plastic pipe is thinner toward the end of the pipe. Thus, these tapered surfaces act to further ensure a sealing fit between the plastic pipe and the plastic band 52 of the multilayer pipe joint. In a similar manner, the slidingly engaging surfaces of the plastic component of the ring or joint and the plastic pipe for the embodiment shown in FIGS. 2 and 3 may be tapered to ensure sealing engagement.

If desired, the plastic band 52 may be provided with a centrally located dovetail portion 58. The dovetail portion 58 causes the tip of the plastic pipe 14 to engage the surface 54 as the sections of pipe are fitted about the joint. An epoxy bead or hydraulic O-ring may be provided along the dovetail groove to further seal the tip of the plastic portion against the plastic component 52. Also, one or more O-rings (not depicted) may be provided along the surface 54 to further seal the plastic component against the plastic pipe 14. The length of the ring or joint depicted in FIG. 4 and the annulus space 16 may be controlled, as previously noted, so that the ends of the joint fit against the cement grout 28. If a dovetail portion 58 is utilized, the width of the dovetail may also be controlled so that the tips of the plastic pipe 14 sealingly engage the dovetail at the same time the ends of the joint engage the cement grout 28.

The ends of the pipe section 12 may be butt-lap joint welded, as shown in FIG. 3, or may be double fillet-lap joint welded, as depicted in phantom lines in FIG. 4. FIG. 4 also shows the end of the metal pipe 12 to be recessed slightly from the end of the plastic pipe 14, which dramatizes the separation of the end of the pipe section in the double fillet-lap joint operation. Both the ends of the metal pipe 12 and the plastic pipe 14 may be cut perpendicular to the axis of the pipe (as shown by pipe 12 in FIG. 4) or may be tapered to facilitate either the welding operation (as shown by pipe 12 in FIG. 3) or to enable a better seal between the plastic component of the joint and the end of the plastic pipe (as shown in FIG. 4). The tapered surface 56 on the plastic pipe may be conveniently formed during a grinding or machining operation at the manufacturing plant.

Other embodiments of the plastic or stainless steel portion of the ring-shaped member are possible. For instance, the ring may be fabricated with the steel band and plastic band as shown in FIGS. 2 and 3, except that only an outer lip 30 is provided (instead of both an outer lip and an inner lip), and a slight annular gap exists where plastic portion 40 is shown. In this embodiment, the plastic outer lip would seal against the plastic pipe at surface 42, and an epoxy bead may be formed in the slight gap between the ends of the plastic pipe. If desired, hydraulic O-rings 46 may also be provided, as shown in FIGS. 2 and 3.

The multilayer pipe joint has been heretofore principally described as a steel casing/cement grout/plastic pipe composition. As noted earlier, however, any number of outer pipe materials, inner pipe materials, and annulus materials may be used which will benefit from the multilayer pipe design. Further, the present multilayer pipe joint is easily adaptable for any combination of multilayer pipe materials. For instance, the inner pipe may be formed from any number of plastics, including PVC, polyethylene, or fiberglass reinforced plastic. A polycarbonate cement or polyurethane may be substituted for the cement grout or other cementitious material in the annulus, although any desired filler material may be used. The present multilayer pipe joint may also be adapted to any number of pipe materials for the exterior of the multilayer pipe, including steel, cast iron, concrete cylinder, asbestos or fiberglass reinforced pipe.

The material of the outer layer of the multilayer pipe will alter the type of bonding required to join the outer layers of the pipe sections after the joint has been properly fitted to the ends of the multilayer pipe. Rather than a welding joint, a victaulic coupling may be used to join the outer layers of pipe. A simple mechanical bond may also be used, such as metal strapping, wherein the ends of the metal strapping are mechanically secured to the ends of the pipe. Alternatively, an adhesive bond or a quick setting plastic or cement composition mixture may be used to join together the outer layers of the multilayer pipe.

The multilayer pipe of the present invention and the novel joint herein described are capable of transmitting any number of corrosive or noncorrosive fluids, including gases, liquids and multiphase combinations. Further, a multilayer pipe joint of the present invention is able to sealingly retain the fluids within the pipeline under either low pressures of up to 150 psi, or under relatively high pressures from 200 to 5,000 psi.

The multilayer pipe joint of the present invention enables sections of multilayer pipe to be used in many situations heretofore economically prohibitive. Compared to mere plastic pipe systems, the present invention enables multilayer pipe systems to be efficiently and reliably installed which benefit from the full use of the wall of the plastic pipe. For instance, in polyethylene pipe, the effective erosion allowance on freestanding pipe becomes the excess wall thickness over and above the wall thickness required for pressure handling capabilities. The multilayer pipe system of the present invention markedly expands the life of the multilayer pipe using a polyethylene inner pipe since this system does not rely on the plastic wall for pressure requirements. The multilayer pipe joint herein described also enables a multilayer pipeline system to be efficiently utilized where plastic pipe alone may not be acceptable. Examples are pipelines subject to risk of vehicle and equipment contact, pipelines exposed to ultraviolet light, pipelines handling dangerous fluids; buried pipelines where the cost of providing a proper soil envelope is prohibitive; pipelines requiring buoyancy regulation; and offshore pipelines where the wave forces, buckling tendencies, and weight comprise significant design parameters.

The novel joint herein described also enables a multilayer pipe system to be efficiently and reliably used under high pressures while benefiting from the desired characteristics of a plastic interior pipe. The combination of an outer steel layer, a cement annulus layer, and a fiberglass reinforced inner pipe should be capable of withstanding pipeline pressures up to 5,000 psi. Further, the effective temperature limit of a plastic pipeline system is increased by using a multilayer pipeline system according to the present invention, since the stress on the plastic component of a multilayer pipeline system is substantially reduced.

Although the present invention has been heretofore described in terms of fabricating the multilayer pipe joints at a manufacturing plant, it is to be understood that in view of transportation costs, it may be desirable to construct the multilayer pipe joints generally near the job site. In that case, portable equipment may be utilized so that the convenient length multilayer pipe joints may be fabricated near the job site.

The lengths of multilayer pipe for the present invention may be fabricated according to the following technique. The outer steel casing may be horizontally positioned with the plastic pipe axially centered within the casing. At the ends of the pipe, a short ring-shaped sleeve may be inserted into the annulus defined by the metal and plastic pipes, which sealingly engages the walls of the pipes to form a fluid-tight chamber. Similarly, plugs may be inserted in the end of the plastic pipe, and a conventional pipe nipple through the annulus plug and another pipe nipple through the plastic pipe plug may be employed for the injection of fluids.

Fluid (e.g., water) may be first injected into the plastic pipe until a desired pressure level is attained. Subsequently, fluid (e.g., cement grout) may be pumped into the annulus under a slightly less pressure. This procedure not only prevents the plastic pipe from collapsing due to the annulus pressure fluid, but preferably the respective plastic pipe and annulus pressures are predetermined with respect to each other so that the tangential strain on the plastic pipe is zero or negligible. Further, this adjustment of internal plastic pipe pressure and annulus pressure to achieve zero tangential strain may be made according to the Poisson's ratio for the material of the plastic pipe. When the fluids are pumped into the plastic pipe and into the annulus space, the plastic pipe is allowed to freely expand axially due to the temperature and pressure of the injected fluids.

Once the annulus material (e.g., grout mixture) has set, fluid pressure may be released and the plastic pipe and annulus end caps removed. Subsequently, any grout mixture may be removed from the ends of the pipe to facilitate subsequent insertion of the dual-material ring, and the end surfaces of the plastic pipe may be ground smooth or tapered, as previously explained.

The cement grout mixture of the present invention may comprise the combination of cement, water and additives for a quick set thixotropic cement. The cement grout mixture may be injected between the outer and inner pipe layers under pressure to prestress the inner plastic pipe prior to exposure to surface conditions. The cement grout mixture may be restricted from the end portions of the pipe to form the annulus 16, or the grout may be formed to the end of the pipe and subsequently ground away to recess the cement layer for accommodating the multilayer pipe joint. Regardless of whether the plastic pipe is tapered at the end to accommodate the plastic portion of the joint, it may be desirable to grind smooth the end of the plastic pipe to facilitate a good epoxy bond to the plastic component of the joint.

If an epoxy bond is used to secure the plastic pipe to the plastic component of the joint, the epoxy preferably will be sufficiently fluid in its uncured state to be easily applied and of a sufficient consistency to properly fill the interfaces and seal the plastic pipe in the joint. If a rapid cure of the epoxy is required and the welding operation does not transmit sufficient heat to the epoxy for that cure, the steel ring may be preheated at the job site with a propane torch prior to insertion of the joint onto the end of the multilayer pipe.

The present invention enables multilayer pipe sections to be fabricated at a plant site and efficiently and reliably installed at the installation site using the novel multilayer pipe joint. Sections of multilayer pipe may be used both for subsea or subterranean pipeline applications and for process piping applications.

Many other alternative forms of the present invention will be apparent from the foregoing methods and apparatus. Accordingly, the structure and techniques herein depicted and described are illustrative only, and are not intended as limitations on the scope of the present invention.

What is claimed is:

1. A ring-shaped member for sealingly joining lengths of pipe having an outer casing, an inner plastic pipe, and an annulus formed between said outer casing and said plastic pipe, comprising:
   a metallic outer band for fitting engagement between said casing and said plastic pipe at adjacent end sections of two lengths of said pipe,
   an inner plastic band connected to and positioned radially inward of said metallic band and having a first surface for encompassing the external diameter surface of said plastic pipe,
   sealing means adjacent said plastic band and adapted for engagement with said plastic pipe for sealing fluid within said pipe, and
   said metallic outer band having a design thickness sufficient to withstand the maximum anticipated radial and tangential forces caused by pipeline fluid pressure independent of said outer casing.

2. Apparatus as defined in claim 1, wherein said inner plastic band comprises:
   an outer lip having said first surface for engagement with said external diameter surface of said plastic pipe, and
   an annular plastic portion approximately centrally located on said ring and having two end surfaces for engagement with respective ends of said plastic pipe of adjacent lengths of said pipe.

3. Apparatus as defined in claim 2, wherein said annular plastic portion has a dovetail cross-sectional configuration for retaining said ends of said plastic pipe in engagement with said outer lip.

4. Apparatus as defined in claim 2, wherein said inner band further comprises:
   an inner lip adapted for positioning radially inwardly of said plastic pipe and having a second surface for engagement with the internal diameter surface of said plastic pipe.

5. Apparatus as defined in claim 4, wherein at least one of said first surface or said second surface is tapered for increased sealing engagement between said plastic band and said plastic pipe.

6. Apparatus as defined in claim 4, wherein said sealing means comprises at least one annular O-ring carried on at least one of said inner and outer lips for engagement with said plastic pipe.

7. Apparatus for forming a pipe system, comprising:
   first and second lengths of pipe each having an outer casing and an inner plastic pipe,
   said outer casing and said inner plastic pipe defining an annular aperture at an end section at each end of said first and second lengths of pipe, and
   a ring-shaped joining member for joining said first and second lengths of pipe, including (a) a metallic outer band positioned within said annular aperture between said casing and said plastic pipe,
(b) an inner plastic band connected to and positioned radially inwardly of said metallic band and positioned at least partially within said annular aperture, and
(c) sealing means adjacent said plastic band and in engagement with said plastic pipe for sealing fluid within said pipe.

8. Apparatus as defined in claim 7, further comprising:
a non-metallic material generally filling said annular aperture between said outer casing and said inner plastic pipe, and
each end of the said metallic outer band is in engagement with said non-metallic material.

9. Apparatus as defined in claim 7, wherein said metallic outer band has a thickness sufficient to withstand the maximum anticipated radial and tangential forces caused by pipeline fluid pressure independent of said outer casing.

10. Apparatus as defined in claim 7, said metallic outer band is adapted to absorb sufficient heat to shield said inner plastic band from excessive temperatures during a welding operation on said outer casing.

11. Apparatus as defined in claim 7, wherein an outer diameter of said outer band is slightly less than an inner diameter of said casing.

12. Apparatus as defined in claim 7, wherein said inner plastic band comprises:
an outer lip positioned between said metal outer band and said plastic pipe and having said first surface in engagement with the external diameter surface of said plastic pipe, and
an annular plastic portion approximately centrally located on said ring and having two end surfaces in engagement with respective ends of said plastic pipe of adjacent lengths of pipe.

13. Apparatus as defined in claim 7, further comprising:
connecting means secured to said outer casing for interlocking adjacent end sections of said first and second lengths of pipe.

14. Apparatus as defined in claim 13, wherein said outer casing is metallic, and said connecting means is a weld on said metallic outer casing for joining said adjacent end sections of said pipe.

15. Apparatus as defined in claim 8, wherein said annular aperture between said outer casing and said inner plastic pipe extends throughout the length of said first and second lengths of pipe.

16. Apparatus as defined in claim 7, wherein said sealing means comprises an adhesive material in engagement with both said plastic band and said plastic pipe for sealing fluid within said pipe.

17. Apparatus as defined in claim 12, wherein
said inner plastic band further comprises an inner lip positioned radially inwardly of said plastic pipe and having a second surface in engagement with the internal diameter surface of said plastic pipe, and
at least one of said plastic pipe internal diameter surface, said plastic pipe external diameter surface, said first surface of said inner plastic band, or said second surface of said inner plastic band is tapered for increasing sealing engagement between said plastic band and said plastic pipe.

18. Apparatus as defined in claim 2, wherein said sealing means comprises an adhesive material in engagement with both said plastic band and said plastic pipe for sealing fluid within said pipe.

19. A method of forming a pipe system, comprising:
forming first and second lengths of pipe each having an outer casing and an inner plastic pipe,
forming an annular aperture between said outer casing and said inner plastic pipe at an end section of each of said first and second lengths of pipe for receiving a portion of a ring-like joining member,
fitting a metal portion of said ring-like joining member within said annular aperture at adjacent ends of both said first and second lengths of pipe,
sealingly engaging a plastic portion of said ring-like joining member with said inner plastic pipe at said adjacent end sections of both said first and second lengths of pipe, and
interconnecting said outer casing of said first length of pipe with said outer casing of said second length of pipe.

20. The method as defined in claim 7, further comprising:
applying an adhesive material to at least one of said plastic portion of said ring-like joining member or said plastic pipe for sealing fluid within said pipe.

21. A method as defined in claim 19, wherein said first length of pipe and said second length of pipe are interconnected by a welding operation.

22. A method of forming a multilayer pipe system, comprising:
forming a first and second length of multilayer pipe each having at least three distinct layers including an outer metal casing, an inner plastic pipe, and a filler material generally filling the annulus between said outer metal casing and said inner plastic pipe,
forming an end section at each end of said first and second lengths of said multilayer pipe including said outer metal casing and inner plastic pipe defining an annular aperture for receiving a portion of a ring-like joining member,
fitting a metal portion of said ring-like member within said annular aperture of said first length of said pipe,
sealingly engaging a first plastic portion of said ring-like member with said plastic pipe portion on said end section of said first length of said pipe,
bringing said second length of pipe axially aligned with both said first length of said pipe and said ring-like member into fitting engagement with said ring-like member,
sealingly engaging a second plastic portion of said ring-like member with said plastic pipe portion on an end section of said second length of pipe, and
interconnecting said metal casing of said first length of said pipe with said metal casing of said second length of said pipe.

23. A method as defined in claim 22, wherein said end section is formed by removing said cementative material between said outer metal casing and said inner plastic pipe for a preselected distance from an end of said pipe.

24. A method as defined in claim 22, further comprising:
applying an epoxy material to said first plastic portion and said second plastic portion of said ring-like member.

25. A method as defined in claim 22, wherein said first length of said pipe and said second length of said pipe are interconnected by a welding operation.

26. A method as defined in claim 24, further comprising:
applying heat to said metal portion of said ring-like member in an amount sufficient to substantially decrease curing time for said epoxy material.

* * * * *